United States Patent [19]

Simone

[11] 4,099,888

[45] Jul. 11, 1978

[54] JUNCTION DEVICE FOR TRIDIMENSIONALLY EXTENDING TRUSSED STRUCTURES

[76] Inventor: Giovanni Simone, Via Bacchiglione, 14, Milan, Italy

[21] Appl. No.: 797,695

[22] Filed: May 17, 1977

[30] Foreign Application Priority Data

May 17, 1976 [IT] Italy ............................ 23324 A/76

[51] Int. Cl.² .......................................... F16B 7/00
[52] U.S. Cl. ..................................... 403/172; 52/81
[58] Field of Search ............... 403/170, 171, 172, 173, 403/174, 175, 176, 178; 52/80, 81, 648

[56] References Cited

U.S. PATENT DOCUMENTS

| 1,679,758 | 8/1928 | Bauersfeld et al. | 403/174 |
| 3,323,820 | 6/1967 | Braccini | 52/81 |
| 3,507,526 | 4/1970 | Packman et al. | 403/173 |
| 3,703,307 | 11/1972 | Curtis | 403/173 |
| 4,027,449 | 6/1977 | Cilveti | 403/171 |

FOREIGN PATENT DOCUMENTS

| 1,294,500 | 4/1962 | France | 403/171 |
| 672,764 | 5/1952 | United Kingdom | 403/173 |

*Primary Examiner*—Andrew V. Kundrat
*Attorney, Agent, or Firm*—Browdy and Neimark

[57] ABSTRACT

A junction device for tridimensionally extending trussed structures, comprising a central joining core, showing a plurality of radially extending seats, wherein the bars by which the field of trussed structure are defined, can be inserted and fastened.

10 Claims, 11 Drawing Figures

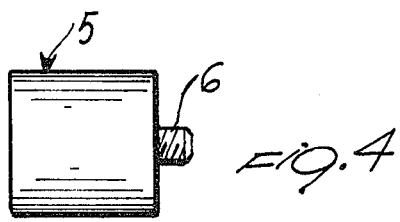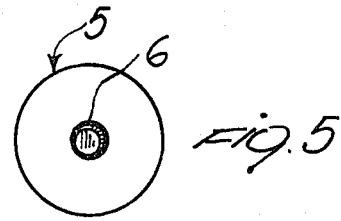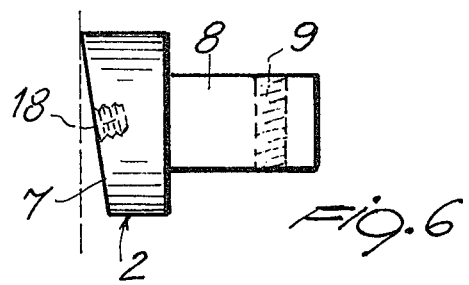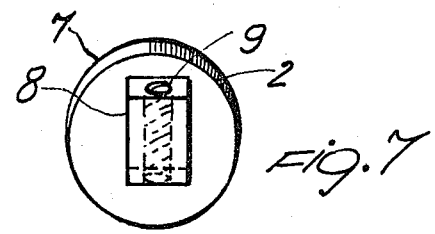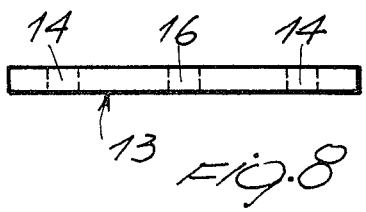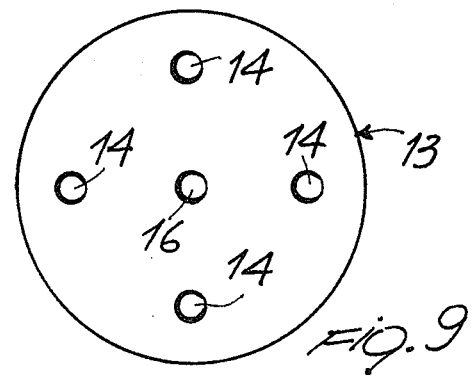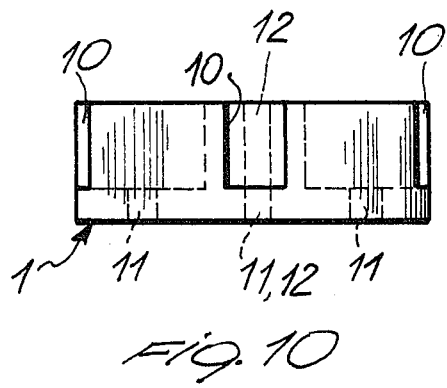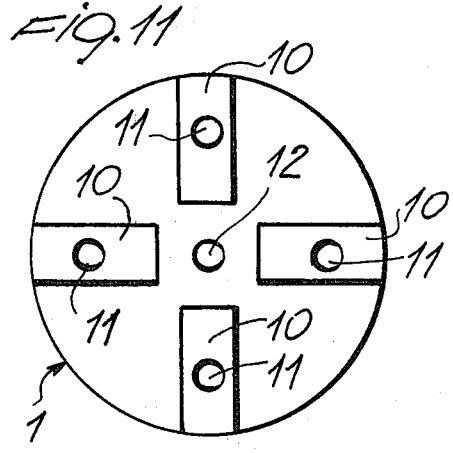

JUNCTION DEVICE FOR TRIDIMENSIONALLY EXTENDING TRUSSED STRUCTURES

BACKGROUND OF THE INVENTION

This invention concerns a junction device for tridimensionally extending trussed structures, of the type designed for the connection of bars by which the trussed structures are defined, meaning by the term "bars" all truss chords or segments regardless of how shaped.

Even if relatively simple continuous or discontinuous, tridimensionally extending trussed structures require the solution of numerous equations to define the precise position in the space of junction points of the trussed structures, as well as the dimensional and structural features of the bars by which the chords and segments of such structures are formed. Since the trigonometric data of each junction point of truss bays is widely different from each other, and since the dimensional and structural features of truss bars also differs from one another, it is apparent how uncertain and expensive a practical commercial realization of nodes or junctions to be utilized in actual structures would be, if the design calculations are to be rigorously respected.

DESCRIPTION OF THE PRIOR ART

As well known, attempts have been made to restrict the variety of junction nodes as called for by the base project, whereby to abate the costs, by having recourse to nodes capable of meeting average junction values of bays, as well as to very heavy truss bars, in order to reduce to one magnitude only, selected as the maximal one, the connection size of rods to nodes, thus obviating the necessity to differentiate same rods as a function of different responses of calculations for each of them.

This obviously leads to very heavy structures, and to an expensive waste of materials.

In addition, the fitting-up and disassembling of heretofore utilized junction systems are rather difficult.

SUMMARY OF THE INVENTION

Briefly, the problem solved by the invention consists in the provision of a junction device for tridimensionally extending trussed structures which permits the provision of bars of any section, converging to the same node, joined in a simple and correct way, thereby making the erection and taking-down operations of trussed structures particularly easy and swift.

According to this invention, the above problem is solved by a joining device for tridimensionally extending trussed structures, which is characterized in that it comprises a central joining core, showing a plurality of radially extending seats, which axes are orthogonal to the axis of said core, a plurality of coupling elements that can be secured to the ends of structural bars, and coaxially inserted, for a given length, into said radially extending seats, and locking means with which same seats are fitted for securing said coupling elements to said core, being the ends of same coupling elements, opposite to said seats, formed with enlargements by which a plane inclined with respect of core axis is defined, and being a tang or prong which can be coupled with the end of related structural bar, connected with said inclined plane. Such tang, the axis of which extends perpendicularly to related inclined plane, shows sizes that can be diversified, depending on those of structural bar ends.

The advantages that can be obtained by the invention consists in particular in that bars of different types can be easily connected with one another by a single type of junction device, fitted with differently dimensioned tangs, whereby trussed structures, strictly answering to project calculations, can be readily erected.

A further advantage consists in that the fastening and removal operations of a rod to, and from, respectively, the related node, can be performed in a wholly independent manner, without involving any other bar. By such independence, the erection and dismantling of a trussed structure are highly facilitated, and the required times are minimized.

BRIEF DESCRIPTION OF THE DRAWINGS

FIG. 4 is a side view of a guide tang, designed to be inserted into the bar ends.

FIG. 5 is a front view of tang, as shown in the FIG. 4.

FIG. 6 is a side view of a coupling element pertaining to device according to the invention.

FIG. 7 is a front view of a coupling element as shown in the FIG. 6.

FIGS. 8 and 9 respectively are a side view and a plan view of the final closing plate of junction device, and;

FIGS. 10 and 11 respectively are a side view and a plan view of central core of junction device.

DETAILED DESCRIPTION OF THE PREFERRED EMBODIMENT FORM

Figure 1:
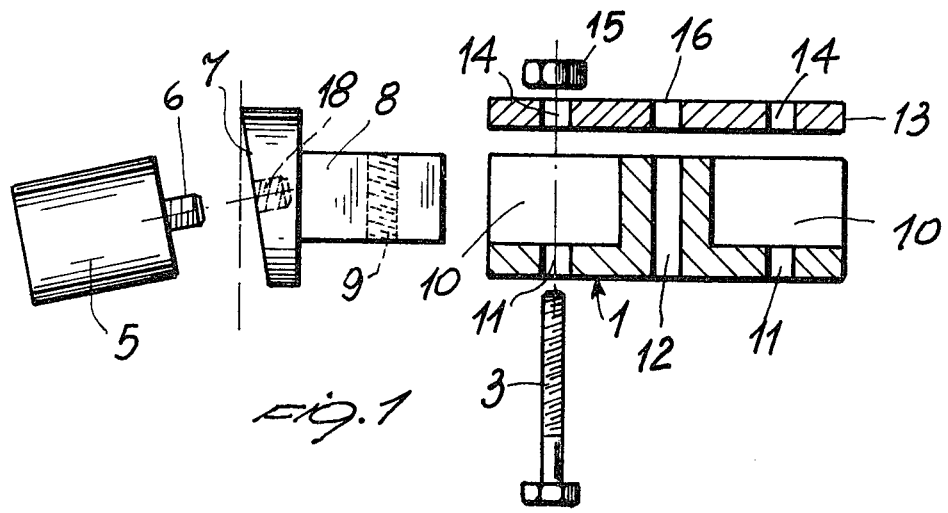
FIG. 1 is an exploded, part sectional view of a junction device according to the invention.

A preferred, but non exclusive embodiment form of the invention will now be described in more detail.

Referring to above figures, the junction device according to the invention, and by which a node or joint is formed for tridimensionally extending, continuous or discontinuous trussed structures, comprises a preferably cylindric shaped central jointing core 1, having a plurality of seats or recesses 10, radially extending all about the axis of such core.

Coupling elements 2 are partly inserted into said seats or recesses 10, and are secure thereto by screws 3, as described in more detail later on.

The end of each coupling element 2, which in its assembled condition is outwardly directed, is enlarged, thereby defining a plane 7 which is inclined in respect of axis of core 1, after such coupling element 2 is fitted thereto.

A portion 8 of each coupling element 3 can be coaxially inserted into the seats or recesses 10, which are complementarly shaped. A crosswise extending threaded hole 9, into which said screw 3 can be screwed, is also formed in each portion 8. A threaded blind hole 18, into which a threaded extension 6 of a guide tang can be screwed, is formed at the center of inclined plane 7.

Figure 2:
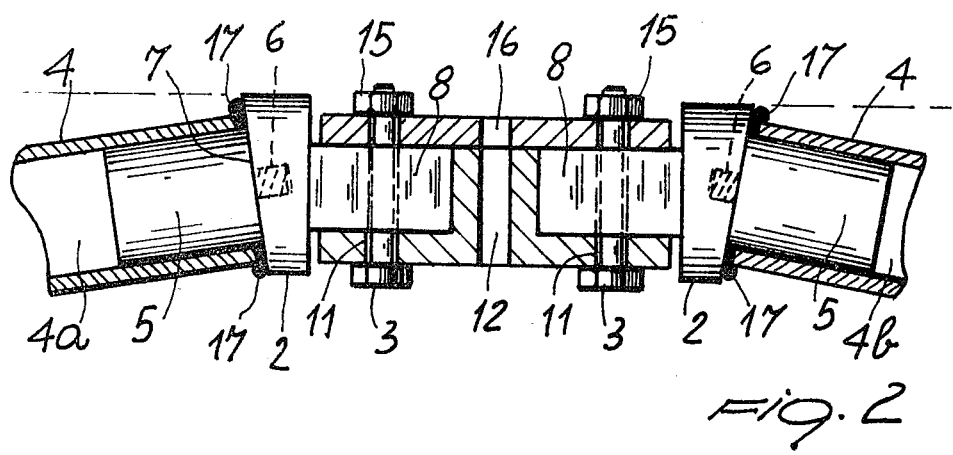
FIG. 2 is a part sectional view of same junction device, in its wholly assembled condition.
Figure 3:
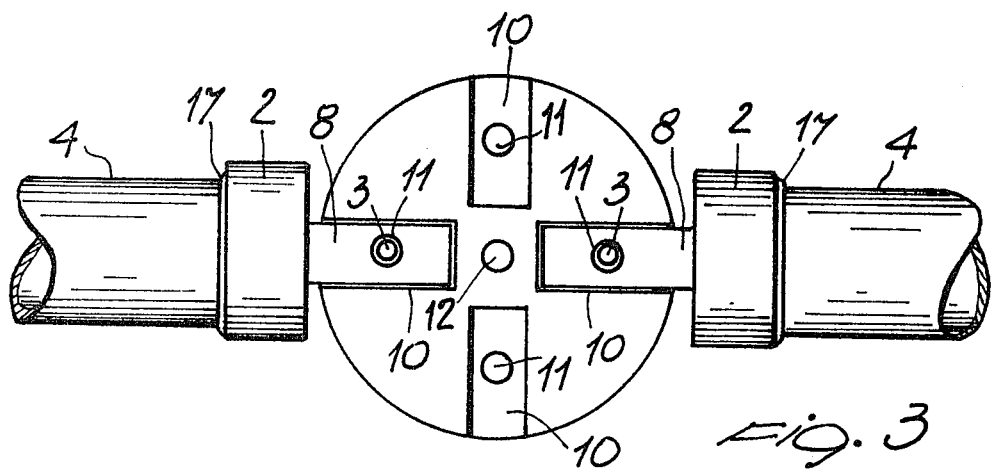
FIG. 3 is a plan view of the assembled junction device, however without its final closing plate.

Said guide tangs 5 consist of small blocks, shaped in conformity with the shape of ends of bars to be connected, and to which they are fitted. Such e.g. cylindric shaped, tangs 5 are inserted into the ends of tubular bars 4 and, as can be seen from FIG. 2, they may show different cross-sectional shapes, according to different sizes of recesses 4a and 4b of said bars.

The central core 1 may be formed with any number of radially extending seats 10 (shown in the figures is a core formed with four seats 10 spaced by 90° from each other). Formed in the seats 10 are through holes 11, located in such a manner as to allow for the introduction of screws 3 which are screwed into the threaded holes 9 of coupling elements 2.

In the assembling step, the central core 1 is completed by a final closing plate 13 having through holes 14 adapted to be aligned above through holes 11. Thus, a short length of the screws 3, which are screwed through the holes 9 of coupling elements 2, can protrude out of said through holes 14, to allow for the screwing of locking nuts 15 thereon.

An axial hole 12 is also formed in the central core 1, in coincidence with a central hole 16 of closing plate 13. Such holes 12 and 16 serve for the possible connection of further structural components, while the trussed structure is being utilized.

In a modified embodiment form, the plate 1 is formed with recesses, complemental to seats 10, for the completion thereof. With regard to the utilization, the coupling elements 2, before being connected with the central core 1, are fastened to ends of bars 4. To such a purpose, the tangs 5 are firstly secured to coupling elements 2, by screwing the projecting portions 6 into the holes 18, whereupon such tangs are inserted into the ends of bars 4. The depth of insertion is adjusted by checking against bench stationary templates, by which the exact length of each bar 4, as established by the project, is reproduced. Once each tang 5 is positioned in respect of bar 4, the related coupling element is welded to its bar 4 as at 17.

After having fitted a coupling element 2 to each bar 4, it is ready for the assembling, i.e. for the connection with the related central core 1 of the junction device.

Obviously, the slope of inclined planes 7 of coupling element 2 should be adapted to the type of trussed structure which is to be erected, and likewise the central core 1 should be formed with an adequate number of suitable, radially directed seats 10.

For the connection to each core 1, the coupling elements 2, welded to bars 4, are inserted into the seats 10 and are locked therein by means of the screws 3.

After all bars 4, converging to each central core 1, have been individually and independently attached to such core, the final closing plate 13 is applied thereon, and the locking nuts 15 are then tightly screwed onto the ends of screws 3 which project out of said plate 13.

It is therefore manifest that the junction device according to this invention can be simply and unexpensively manufactured, can be easily fitted and is unusually rugged, thanks to the fact that, after having locked the parts 8 into the seats 10, the coupling elements 2 can be considered as integral with the central core 1, being the shape of said seats 10 complemental to that of parts 8.

It has been found that the predisposition of inclined planes 7 on the coupling elements 2 is highly advantageous, since it allows utilization of the bars 4 with their ends as originally square cut.

Moreover, it has been proved advantageous to have the tangs 5 produced separately from the coupling elements 2, since such tangs, having a very simle structure, can be thus produced in many shapes and sizes, for the adaptation to ends of bars 4 of different types.

A further advantage consists in the easy locking of coupling elements 2, which is obtained by the screw 3 only, thereby furthering the erection and dismantling operations of trussed structures, and in particular of the more heavy ones.

At any rate, the locking system by means of screws 3, is suitable to protect in each case the nodes from the effects of torsional loads.

Obviously, many changes and modifications are possible within the scope of the invention.

Thus, e.g. in another embodiment form (not shown) the locking is performed by pins, utilized instead of screws 3, and which are suitably forced into the holes 9 — which in that case may be non threaded — of coupling elements 2.

It is moreover possible to have the tang integrally made with the related coupling element. In particular, such construction is advantageous in the case of bars with a circular cross-section, since it obviously allows a saving in the machining operations.

What is claimed is:

1. A junction device for tridimensionally extending trussed structures, of the type designed to connect structural bars, by which the bays are defined, with one another, the device comprising a central connecting core having an axis, said core having a plurality of radially directed seats formed thereon, said seats having respective axes which are orthogonal with respect to said axis of said core;

a plurality of coupling elements which are to be secured to ends of respective structural bars and can be partially and coaxially inserted into said radially directed seats each said coupling element having an outwardly directed end formed as an enlarged portion which has a surface in a plane inclined with respect to said axis of said core;

locking means fitted to said seats for fastening said coupling elements to said core; and a plurality of tangs which are to be coupled with ends of respective structural bars, each said tang having an axis perpendicular to said inclined plane of a respective one of said enlarged portions and being of a size determined by the size of a structural bar with which it is to be connected.

2. A junction device according to claim 1, including a closing plate fitted on top of said core, and means for securing said closing plate to said core.

3. A junction device according to claim 2, wherein said closing plate is formed with recesses complemental to said seats for completion thereof.

4. A junction device according to claim 1, wherein said locking means comprise, for each said coupling element a respective fastening means axially extending across said core and in engagement with an inserted portion of a respective one of said coupling elements to firmly retain it within a respective one of said seats.

5. A junction device according to claim 1, including a closing plate fitted top of said core, and wherein said respective fastening means is a respective bolt by which respective ones of said coupling elements are retained and which also extends across and out of said closing plate, a plurality of nuts screwed onto projecting ends of respective ones of said bolts to secure said closing plate to said core.

6. A junction device according to claim 1, wherein each of said tangs is integrally formed with its associated one of said coupling elements.

7. A junction device according to claim 1, wherein each said tang consists of a body separate from said coupling element, further including fastening screw means for securing said coupling elements to said tangs.

8. A junction device according to claim 1, wherein each said tang can be inserted into a recess formed in an end of structural bars, respective ones of of said tangs having cross-section complemental to that of respective recesses in the bars.

9. A junction device according to claim 1, wherein said coupling elements are secured to the ends of said bars by a weld seam made of said inclined plane, a selected portion of at least one of said tangs being inserted into a corresponding related end of one of said bars for adjustment of distance between two coupling elements as fitted to respective ends of the same bar.

10. A junction device according to claim 1, wherein said core is formed with an axial bore, for possible connection of further components in a course of utilization of a trussed structure.

* * * * *